United States Patent Office 3,252,848
Patented May 24, 1966

3,252,848
NONFOAMING PROCESS FOR THE PREPARATION OF URETHANE LAMINATES FROM FIBROUS MATERIALS
Joaquin V. Borsellino, Levittown, Pa., assignor to Thiokol Chemical Corporation, Bristol, Pa., a corporation of Delaware
No Drawing. Filed May 14, 1962, Ser. No. 194,662
8 Claims. (Cl. 156—307)

The present invention relates to a novel nonfoaming process for the preparation of laminated structures from fibrous materials. In particular, the present invention relates to the preparation of laminates from a plurality of layers of woven and/or nonwoven fibers.

Fabrics made from nonwoven fibers have found use in such diverse articles as interlinings between layers of woven fibers in the collars of men's suit coats, as wiping cloths, mops, innersoles of shoes, belt inserts, book bindings, rug backings, luggage coverings, upholstery, sanitary products, filter media for liquids, coated fabrics, lamp shades, leather substitutes, bedspreads, closet accessories, comforters and quilts, dish towels, doilies, dust cloths, ironing board covers, napkins, tablecloths, vacuum cleaner bags, wash cloths, window shades, advertising specialties, bags and bagging, buffing and polishing wheels, camouflage cloth, caskets, cheese coverings, wall covering, shoe uppers, decontamination clothing, decorative items such as ribbons, stage props, window displays, parade floats, artificial flowers, Christmas package wrappings, doll clothes, electrical insulating tapes, flags, pennants, banners, gaskets, labels, meat wrappers, packaging material, permanent wave pads, pipe coverings, plastic laminated, radio and television grill covers, seed bed covers and shoe shine cloths. A definitive explanation of the nature of fabrics made of nonwoven fibers, of their present modes of manufacture, of their current modes of usage, of their desirable qualities and the nature of their limitations is all exhaustively discussed in "Nonwoven Fabrics—An Unbiased Appraisal," by Coleman M. Brandt et al., and published by Nonwoven Associates in 1959 (Library of Congress No. 59-13229).

Although attempts to combine layers of fibrous materials and in particular, layers of nonwoven fabrics with layers of woven fabrics, by lamination or interfacial bonding methods have been made with many of the commercially available adhesive compositions, a completely satisfactory product has not been commercially available up to the present time. The laminated structures obtained with the prior art processes and adhesives have shown puckering defects, that is to say an undesirable bunching of woven fabric in time; or a delamination occurs with time over small areas of the interfacial surface producing a pocked appearance at the outer surface of the woven fabric; or a functionally or aesthetically undesirable changing of the qualities of drape and hand of the composite structure, from that of both the woven and nonwoven component fabrics occurs, as evidenced by undue stiffening; or a delamination occurs upon washing or dry cleaning the laminated fabrics; or indeed, and most usually, combinations of more than one of the foregoing undesirable results takes place.

One object of the present invention is to provide novel bonded structures made of woven and/or nonwoven fibers. Another object of this invention is to provide a novel process for fabricating novel, bonded, laminated structures, from woven and/or nonwoven fibers. Still another object of this inevntion is to provide novel bonded structures made from woven and/or nonwoven fibers which are particularly resistant to the delamination that occurs in prior art laminations due to conventional washing and dry cleaning processes. Yet another object of this invention is to provide novel bonded structures made from woven and/or nonwoven fibers that are unusually resistant to localized delaminations as would be evidenced by a pocked, puckered, distended or blistered appearance of the outer surface of one or more sides of such bonded structures. A further object of this invention is to provide novel bonded laminates made from woven and/or nonwoven fibers which possess such qualities of drape and handle that are aesthetically pleasing and which qualities may be prescribed by a knowledge of the composite qualities of drape and handle possessed by the individual component woven and/or nonwoven fibrous materials employed therein.

The bonded structures or laminates of the present invention consist of at least two layers of fibrous materials bonded together by means of an adhesive interlayer, the interlayer being a cured polyurethane composition. Various combinations of layers of woven and/or nonwoven fibers may be used in preparing the laminates according to the process of the present invention.

It has been unexpectedly found that the objects of the present invention can be readily realized if (a) There is applied to one or more of the contact interfacial, e.g. "wrong" side, surfaces of the layers of fibrous materials being bonded together a liquid bonding composition comprising one or more imine, oxime or ketoxime blocked urethane prepolymer having a molecular weight of about 400 to 6000 and preferably 2000 to 3000 and a ratio of equivalents by weight of isocyanate of the prepolymer to equivalents by weight of active hydrogen of the blocking agent of about 1/1 to 2/1—preferably about 1.5/1 to 1.8/1 and sufficient quantities of at least one crosslinking or curing agent to provide a ratio of equivalents by weight of isocyanate of the prepolymer to equivalents by weight of active hydrogen of the curing agent of about 0.5/1 to 2.0/1 and preferably about 1.0/1;

(b) The wrong side surfaces of the fibrous layers are then nipped or pressed together under pressures of up to about five pounds per square inch to produce a surface wetting of the layers by the tacky-surface deposit of the aforesaid liquid bonding system and a temporary face to face adherence of the wrong side surfaces to each other; and (c) The nipped face to face adhering layers are then subjected to a heat treatment of about 175 to 400° F. and preferably for relatively short periods of time, i.e., about 0.5 to 120 minutes, to unblock and heat cure the urethane prepolymer and thus permanently bond the layers together.

The face to face adherence of the paired wrong side surfaces noted above is temporary in that it is not intended to be and is not in fact a permanent bond and lasts only until the curing agent and curing temperatures actually effects the permanent bond. The temporary adherence is brought about by the combined liquid and unusually tacky nature of the handling composition and the nipping or pressing together of the fibrous layers, which, because of their natural compressible natures can be pressed together under these conditions to form a temporarily bonded structure which will resist delamination though subject to moderately rough handling during the remainder of the process prior to formation of the permanently bonded lamiante. The process of the present invention can be run under a batch or continuous operating conditions.

The utility of the novel bonding compositions of the present invention in the fabrication of fibrous material laminates is greatly enhanced by the tacky nature of these compositions. The tackiness of these compositions can be regulated, moreover, to provide compositions having lesser or greater degrees of tackiness as the fibrous materials being used require. The compositions become tacky as the cure of them progresses to the gel point of the curing compositions. They have the highest degree of tackiness just prior to the gel point and are not very tacky after the gel point and get even less tacky as the cure reaction continues past the gel point. It is thus possible, for example, to prepare and use according to the present invention partially blocked and partially cured prepolymers so as to have available adhesive compositions of varying degrees of tackiness for use with various combinations of layers of fibrous materials.

By a "wrong" side surface it is meant, according to the present invention, the interfacial surfaces of the fibrous layer components which are not to be the outside facing surfaces of the resulting laminated product. They are the inside surfaces of the fibrous layers to which the adhesive composition is applied and across which the curing reaction occurs to bond the several layers together. It is within the concept of the present invention to bond more than two layers of fibrous materials together. In such cases the inner layer(s) of the laminated structure will have two wrong or inside surfaces. Where more than two layers of fibrous materials are to be laminated together each pair of wrong side surfaces to be bonded together may be processed successively or concurrently. About 0.5 to 4 ounces by weight of the bonding composition are needed for about every square foot of laminated area according to the present invention. The bonding compositions should have a solids content of about 35 to 80% and preferably about 50 to 70%.

The urethane prepolymers which may be used in the bonding compositions in the present process may have in general either an ester and/or an ether backbone. The ester type materials, however, are preferred. The most preferable of these ester materials are the esters prepared from ethylene glycol/propylene glycol/adipic acid mixtures. Castor oil may also be used. The useful prepolymers are formed by so reacting the ester and/or ether materials with one or more organic diisocyanate group containing materials such as toluene diisocyanate, diphenyl methane diisocyanate, 1,5-naphthalene diisocyanate and hexamethylene diisocyanate that the resulting product has an —NCO content of about 2.5 to at most about 10% and preferably about 3% by weight.

In forming the blocked prepolymers the prepolymers may be blocked with one or more imine, oxime or ketoxime blocking agents such as ethylene imine, propylene imine, acetophenone oxime, butyraldoxime, methyl methyl ketoxime, cyclohexanone oxime and methyl ethyl ketoxime. The ketoxime blocked prepolymers are preferable because they generally have better cure temperature properties and can be stored for rather indefinite periods of time prior to use. The most preferable blocking agent is methyl ethyl ketoxime. In blocking the prepolymers, the prepolymer and blocking agent are reacted in the ratio of equivalents by weight of active —NCO units to imine, oxime or ketoxime blocking agent units of about 1.0/1 to 2.0/1.

It is preferable to react the prepolymers and the blocking agents in solution. The nonaqueous organic cosolvent system chosen should be capable of dissolving not only the prepolymer and the blocking agent, but preferably the curing agents as well, used in the bonding compositions, and further, should be of such volatility that it may be readily and completely volatilized during the period of cure at the elevated cure temperatures employed and yet further be of such nature so as not to impair the properties of the fibrous material components. Among the more useful nonfoamable solvents which may be used in the process of the present invention there are aromatic solvents such as benzene, toluene and xylene, esters such as butyl acetate, cellosolve acetate and ethyl acetate, chlorinated hydrocarbon solvents such as methylene chloride, trichloroethylene and perchloroethylene, and aliphatic ketone solvents such as acetone and methyl ethyl ketone, or compatible combinations thereof. The use of alcohols, amines and water, as solvents, are preferably avoided in the practice of this invention because of the tendency of these solvents to interfere with the necessary blocking and cure reactions. This latter group of solvents may be used, however, under such conditions where they do not interfere with the blocking or curing reactions as where they are used with the prepolymer after it is blocked and where they are removed therefrom before it is cured. The solvents may be used singly or in combination, the choice by the practitioner of a specific solvent system being usually dependent upon factors such as the solubility values of the specific solutes therein, the time and temperatures required by a specific embodiment of the invention for complete removal of solvent by volatilization, and also the solubility and chemical resistance of the fibrous material components in the specific solvent systems.

The process of the present invention prescribes an unblocking of blocked diisocyanate terminated prepolymers at effective elevated temperatures of about 175° F. to 400° F., followed by crosslinking of the thus activated isocyanate terminals with curing agents at these same temperatures to provide therewith the bonding action needed to bond the several layers of fibrous materials together. The effective curing time, as noted above, may vary from 0.5 to 120 minutes depending on the curing temperatures employed, the higher temperatures requiring the shorter times. The effective temperature and curing times employed should be such as to allow for the substantial removal of the solvent before the actual curing procedure so that the presence of substantial amounts of solvent do not interfere with the curing reaction. Curing agents which are nonfoam forming and effective in the process of the present invention include N,N,N',N'-tetrakis(2-hydroxypropyl)ethylene diamine, triisopropanolamine, triethanolamine, diethanolamine, diisopropanolamine, phenyl diethanolamine, dichlorobenzidine and N-methyl diethanolamine. N,N,N',N'-tetrakis(2 - hydroxypropyl)ethylene diamine is the preferred curing agent because of its overall curing properties. The curing agents are usually dissolved in the bonding solutions containing the blocked prepolymer prior to use, and may be added to such compositions and stored with them for substantial periods of time prior to use and yet produce no deleterious results. The curing agents are added to the blocked prepolymer systems in such quantities as noted above as to provide for ratios in equivalents of total isocyanate, both blocked and free, to that of reactive hydrogen groups which are furnished by the curing agents in the form of OH or $NH_2$ groups, of about 0.5/1 to 2.0/1 and preferably about 1.0/1.

Cure accelerators may also be used in the bonding compositions of the present invention where it may be desired to hasten the rate of cure and/or to reduce the temperature required to effect the cure. Cure accelerators which may be used in this regard include stannous octoate, lead octoate, 2,2,1-diazobicyclooctane, tetramethylbutane diamine, dibutyl tin di-2-ethylhexoate, metallic naphthenates and metallic acetylacetonates. Up to about 5 parts by weight of the accelerators may be used per 100 parts by weight of blocked prepolymer. The cure accelerators, however, are preferably added to the bonding compositions shortly before the latter's use in the laminating process to avoid the storage of the accelerators with the blocked polymer/cure agent systems for prolonged periods of time.

Thickening agents are also of use in certain embodiments of this invention, in that by their inclusion, in some instances, in the bonding compositions they help to prevent an undesirable "strike through" or complete penetration by the wet bonding composition to the outer surface of the fibrous material components of the proposed laminate. Where used, such thickening agents are usually inert filler type materials such as the powdered silicon dioxides and may be present in the bonding compositions in amounts of about up to 50 parts by weight per 100 parts by weight of blocked prepolymer. "Strike through" may also be prevented by increasing the viscosity of the bonding compositions by only partially blocking the active —NCO terminals of the prepolymer and then preparing a partially cured prepolymer from the partially blocked prepolymer for use in these compositions. The partially cured prepolymers are more viscous than the totally blocked prepolymers.

It has now been unexpectedly found that where the bonding process of the present invention is used that the resulting novel composite fibrous material laminates are most unusual, not only in that they possess qualities of "handle" and "drape" that are most pleasing aesthetically, but also that the handle and drape of the laminate appear to be a simple composite of the individual qualities of hand and drape of the fibrous material components used therein; these qualities not being substantially affected, modified or impaired through the use of a bonding interlayer. It has also been unexpectedly found that the bonded fibrous material structures produced by the process of the present invention are unusually resistant to the type of delamination which is common to prior art fibrous material laminates upon repeated washing and/or dry cleaning operations. Further, is has also been unexpectedly found that these bonded fibrous material structures are unusually resistant to localized delamination which is common to prior art fibrous material laminates and which results in an unsightly, pocked, puckered, distened and/or blistered appearance on one or more of the surfaces of the laminate.

The woven fibrous materials which may be employed in the process and structures of the present invention include natural fiber weaves from silk, cotton, linen, wool filaments, and synthetic fiber weaves from cellulose acetate, cellulose triacetate, regenerated cellulose (rayon), spun glass, polyamides, polyesters, polyacrylates, polyethers, polyurethanes (including "Spandex" fibers), polyolefins, polyvinylidene chloride, polyvinyl chloride, and other filaments and/or weaves from compatible blends of any of the foregoing.

The nonwoven fibrous materials which may be employed in the process and structures of the present invention include nonwoven materials made from any of the natural and synthetic fibers mentioned above using any of the usual felting, thermal and chemical bonding techniques known to the art.

As used in relation to the present invention the term "nonwoven fibrous material" also includes paper. The paper should not be of such a nature or have been treated in any such way which would render its wrong side surfaces, as defined above, resistant to penetration during the nipping operation by the adhesive compositions of the present invention. Various types of paper may be used including the more porous types such as filter paper, the heavy walled types such as kraft paper and the corrugated paper types.

Laminates made with one or more layers of paper are useful as inexpensive disposable filters for air conditioning units, insulating media or cushioned packaging media.

In general, the woven and nonwoven raw materials to be used in the process of the present invention are selected so as to produce specific laminated end products by taking into consideration only the properties of the individual fibrous materials and how these properties would modify one another by combination into a composite laminate. The bonding interlayer therefore, need not be considered in the use of the present invention in the sense of having an important modifying influence on the properties of the fibrous raw materials being used as would otherwise be the case in the use of prior art methods. The novel capabilities and conveniences thus provided in the design of laminated structures by the present invention, therefore, impart substantial advances to the fibrous material laminate arts.

The bonding compositions may be prepared by (a) dissolving the desired prepolymer in a select solvent system; (b) by adding the desired blocking agent to the liquid mixture to form the dissolved blocking prepolymer, and then, (c) by dissolving and/or dispersing the desired curing agents and cure accelerators and/or thickening agents in the blocked prepoylmer system. In this process the following cautions obtain: the components of the system should be compatible and not cause premature reactions with the curing agent and/or the —NCO groups; the compositions should be formed and stored at temperatures of less than about 125° F.; where prolonged periods of storage of the bonding compositions are desired, the bonding compositions should be prepared without cure accelerators, and, however, where cure accelerators are deemed necessary to the pursuit of specific embodiment of the bonding process the cure accelerators should be added to the bonding compositions within a short interval prior to use.

The following examples are merely illustrative of the present invention and are not intended as a limitation upon the scope thereof.

*Example 1*

A liquid bonding composition was formed by (a) dissolving 100 parts by weight (p.b.w.) of a prepolymer having an —NCO content of about 3% and containing an 80/20 ratio of repeating units of ethylene glycol adipate/propylene glycol adipate in the molecular backbone thereof and having an average molecular weight of about 3,000, in 66.3 p.b.w. of the solvent methylene chloride, and (b) by adding 5.7 p.b.w. of methyl ethyl ketoxime to form a ratio in equivalents of isocyanate/ketoxime blocking units of about 2/1 to form a half-blocked prepolymer, and, (c) adding 4.8 p.b.w. of N,N,N′,N′-tetrakis(2-hydroxypropyl)ethylene diamine to form a ratio in equivalents of total isocyanate (both free and blocked)/active hydrogen curing units of about 1.15/1.

The bonding composition was then diluted with enough methylene chloride to form a sprayable mixture having a solids content of about 50%. Just prior to use, 1% by weight of lead octoate, based upon the weight of prepolymer, was added and dispersed in the bonding mixture.

The above bonding composition was sprayed onto the "wrong" side of 4″ x 6″ swatches of "Zelan" waterproof-treated heavy cotton duck cloth. The sprayed duck cloth and a felted nylon nonwoven fabric, sold by Wellington-Sears as Lantuck 6447, were nipped together under pressure, the adhesive-wetted surface of the woven fabric being in contact with the nonwoven fabric. The composite "nipped" swatches were then placed in an oven for 5 minutes at 250° F. to produce a laminated composite fabric. The latter showed no puckering, had excellent snap back, good hand and drape, and no areas of delamination. Upon attempts to separate the woven layer from the nonwoven layer, no delamination occurred at the interface, however, the nonwoven fabric parted within itself.

*Example 2*

Using the bonding composition, nonwoven fabric and bonding procedure described in Example 1, laminates were made with a bleached porous cottom weave of ordinary woof and fill instead of the cotton duck cloth used in Example 1. The composite fabrics produced showed excellent snap back, hand and drape, and no delaminations, puckering or bunching, and no separation of the fabrics occurred at their bonded interface when attempts were made to cause this. Again, upon such attempts the nonwoven fabric parted within itself.

*Example 3*

A bolt of printed rayon cloth, such as that used for the inner linings of ladies outer coats, were roller coated on the "wrong" side with the bonding composition of Example 1, and then nipped together under pressure with a bolt of nonwoven nylon felted fabric. The composite nipped fabrics were then drawn over hot rollers set at 275 to 300° F., the time required for any one point on the fabrics to pass over the series of rollers being approximately two minutes. Laminates were produced thereby which were smooth on the woven fabric surface and which showed excellent hand, drape and snap back, and which exhibited no areas of delamination, no puckering, bunching or pocking.

The composite laminated fabric was fashioned into an inner lining for a woman's coat, and was placed therein. The coat with the innerlining was very appealing aesthetically; the inner lining showed excellent body, a singular lack of bulkiness, and insulating properties, had no irregularities, and exhibited a most pleasing drape, handle and other qualities.

*Example 4*

Bolts of nylon cloth, poplin cotton cloth, and a fabric blend of "Dacron" polyester fiber and wool fiber were each roller coated with the bonding composition of Example 1 on the "wrong" side of the fabrics, and then each was nipped under pressure with bolts of nonwoven nylon gelled fabric. The composite nipped fabrics were then drawn over hot rollers at about 175–300° F., the time required for any one point of the fabrics to pass over the series of rollers being approximately 1½ to 2 minutes. Laminates were produced thereby that showed no areas of delamination or surface defects, but which did possess the combined excellent hand and drape properties of the individual component fabrics.

I claim:
1. A nonfoaming process comprising (a) applying about 0.5 to 4 ounces by weight of a liquid adhesive composition per square yard to at least one interfacial contact surface of at least one of each pair of a plurality of layers of a proposed fibrous material laminate to provide a tacky surface deposit of said adhesive, said adhesive composition comprising a nonaqueous solution of at least about 35 percent by weight solids content of a urethane prepolymer blocked with a blocking agent selected from the group consisting of imines, oximes and ketoximes, said blocked prepolymer having a molecular weight of about 400 to 6000 and a ratio of equivalents by weight of isocyanate of said prepolymer to equivalents by weight of active hydrogen of said blocking agent in the range of about 1/1 to 2/1 and sufficient quantities of at least one organic crosslinking-curing agent to provide a ratio of equivalents by weight of isocyanate of said prepolymer to equivalents by weight of active hydrogen of said crosslinking-curing agent in the range of about 0.5/1 to 2.0/1, (b) nipping said layers together so as to produce a surface wetting of said layers by said adhesive composition and thus occasion a temporary face to face adherence of paired interfacial contact surfaces and (c) heating the temporarily adhering layers to an effective temperature for an effective time interval so as to at least substantially remove the solvent therefrom, unblock the prepolymer and cure the unblocked prepolymer with said crosslinking curing agent to effect a permanently bonded laminate.

2. A process as in claim 1 in which said adhesive composition further comprises up to about 5 parts by weight of at least one cure accelerator per 100 parts by weight of the unblocked prepolymer.

3. A process as in claim 1 in which said adhesive composition further comprises up to about 50 parts by weight of at least one filler per 100 parts by weight of the unblocked prepolymer.

4. A process as in claim 1 in which said blocking agent is methyl ethyl ketoxime.

5. A nonfoaming process interruptable at any point therein and subsequently continuable to provide laminates of a plurality of layers of fibrous materials composed of discrete fibers and cured nonfoamed urethane interlayers therebetween comprising:

(a) Applying from about 0.5 to 4 ounces by weight of a liquid composition so as to wet with a tacky deposit of said composition at least one of each two contact interfacial surfaces of said layers of fibrous materials per square yard of contact interfacial surface, said adhesive composition comprising a nonaqueous solution of about 35 to 80 percent by weight solids content of a urethane prepolymer blocked with a blocking agent selected from the group consisting of imines, oximes and ketoximes, said blocked prepolymer having a molecular weight of about 400 to 6,000 and a ratio of equivalents by weight of isocyanate of said prepolymer to equivalents by weight of active hydrogen of said blocking agent in the range of about 1/1 to 2/1 and sufficient quantities of at least one organic crosslinking curing agent to provide a ratio of equivalents by weight of isocyanate of said prepolymer to equivalents by weight of active hydrogen of said curing agent in the range of about 0.5/1 to 2.0/1;

(b) Joining said layers of fibrous materials under pressure such that their contact interfacial surfaces are mutually wetted by said adhesive composition and such that a temporary adherence is thereby effected between each two layers of fibrous materials so joined by said liquid adhesive composition interlayers therebetween; and (c) Heating the thus joined and adhering plurality of fibrous layers and liquid adhesive interlayers therebetween at an effective temperature for an effective time interval so as to volatilize said solution's solvent, unblock said prepolymer and said blocking agent, volatilize said blocking agent, interact said prepolymer and said crosslinking curing agent so as to cure said prepolymer to a solid interlayer and thus permanently bond therewith said fibrous layers.

6. A process as in claim 5 in which said heating is conducted at about 175° to 400° F.

7. A process as in claim 5 in which at least one of said layers is a layer of woven fibers.

8. A process as in claim 5 in which at least one of said layers is a layer of nonwoven fibers.

References Cited by the Examiner

UNITED STATES PATENTS

| 2,360,192 | 10/1944 | Bestian et al. | |
| 2,723,935 | 11/1955 | Rodman. | |
| 2,797,232 | 6/1957 | Bunge | 260—471 |
| 2,826,526 | 5/1958 | Meyrick et al. | |
| 2,952,665 | 9/1960 | Bunge et al. | 260—77.5 |
| 2,972,554 | 2/1961 | Muskat et al. | |
| 2,993,813 | 7/1961 | Tischbein | 260—77.5 |
| 2,993,869 | 7/1961 | Gmitter et al. | 260—77.5 |
| 3,050,432 | 8/1962 | Weinbrenner et al. | |

FOREIGN PATENTS

| 543,986 | 7/1957 | Canada. |
| 558,645 | 6/1958 | Canada. |
| 118,839 | 8/1944 | Australia. |
| 167,675 | 7/1952 | Australia. |
| 808,421 | 2/1959 | Great Britain. |

OTHER REFERENCES

Dombrow, B. A.: Polyurethanes, Reinhold, New York, 1957, pp. 26, 27, 56, 57.

EARL M. BERGERT, *Primary Examiner.*

W. B. WALKER, C. B. COSBY, *Examiners.*